United States Patent [19]

Helminiak et al.

[11] 4,207,407

[45] Jun. 10, 1980

[54] AROMATIC HETEROCYCLIC POLYMER ALLOYS AND PRODUCTS PRODUCED THEREFROM

[75] Inventors: Thaddeus E. Helminiak, Dayton; Charles L. Benner, Fairborn; Fred E. Arnold, Centerville; George E. Husman, Xenia, all of Ohio

[73] Assignee: The United States of America as represented by the Secretary of the Air Force, Washington, D.C.

[21] Appl. No.: 902,525

[22] Filed: May 3, 1978

[51] Int. Cl.$^2$ .................... C08L 79/06; C08L 79/04
[52] U.S. Cl. .................................. 525/425; 525/432; 525/435; 525/536; 525/540

[58] Field of Search ................. 260/823, 857 PA, 860; 528/211

[56] References Cited

FOREIGN PATENT DOCUMENTS 1122925 8/1968 United Kingdom ..................... 260/823

Primary Examiner—Wilbert J. Briggs, Sr.
Attorney, Agent, or Firm—Joseph E. Rusz; Cedric H. Kuhn

[57] ABSTRACT

Rod-like aromatic heterocyclic polymers are used as reinforcement in coil-like heterocyclic polymer matrices to provide composites at the molecular level that are analogous to chopped fiber composites.

12 Claims, No Drawings

AROMATIC HETEROCYCLIC POLYMER ALLOYS AND PRODUCTS PRODUCED THEREFROM

RIGHTS OF THE GOVERNMENT

The invention described herein may be manufactured and used by or for the Government of the United States for all governmental purposes without the payment of any royalty.

FIELD OF THE INVENTION

This invention relates to polymeric alloys of rod-like aromatic heterocyclic polymers and coil-like aromatic heterocyclic polymers. In one aspect it relates to a method for the preparation of composite films at the molecular level that are analogous to chopped fiber composites. In another aspect it relates to composite films prepared from para ordered, rod-like aromatic heterocyclic polymers embedded in an amorphous heterocyclic system.

BACKGROUND OF THE INVENTION

Fiber-reinforced plastics currently being used in the fabrication of load-bearing structural components are light weight, durable and low cost. The fabrication of such components involves a complex stepwise procedure. The strength and durability of the composite is largely dependent upon the existence of an extensive, long lasting load-transferring interface between the reinforcing fibers and the plastic matrix. A need exists for high strength reinforced composites and a method for their manufacture which possess at least the following desirable prerequisites: (1) non-reliance on fiber reinforcement for the attainment of high strength properties, (2) circumvention of the complexities of current composite fabrication procedures, and (3) elimination of any possibility of fiber-plastic interface problems.

It is an object of this invention, therefore, to provide a polymer alloy of a rod-like aromatic heterocyclic polymer and a coil-like amorphous heterocyclic polymer for use in the fabrication of high strength composites.

Another object of the invention is to provide composite materials at the molecular level that are analogous to a chopped fiber composite.

A further object of the invention is to provide a method for preparing composite films composed of rod-like aromatic heterocyclic polymers and analogous soft amorphous matrices.

Other objects and advantages of the invention will become apparent to those skilled in the art upon consideration of the accompanying disclosure.

SUMMARY OF THE INVENTION

Broadly speaking, the present invention resides in a polymeric alloy comprising a mixture of a flexible coil-like heterocyclic polymer and a reinforcing amount of a rod-like aromatic heterocyclic polymer. It has been discovered that the stiff chain, rod-like polymers function as a reinforcement in coillike polymer matrices. As a result a composite at the molecular level can thereby be readily fabricated that is analogous to chopped fiber composites.

As intimated above, the role of the rod-like polymer molecules, individually and in aggregate, is to reinforce the softer, more flexible matrix material, thereby improving the modulus and tensile strength of the composite mixture. Furthermore, the composite mixture can be induced to exhibit anisotropic mechanical properties by causing flow of the polymer mixture. Extensional flow causes the individual and aggregate stiff chain, rodlike polymer molecules to orient in the direction of flow, and as a consequence of the orientation the mechanical properties are vastly improved.

In one embodiment, the invention lies in a composite film comprising a coil-like heterocyclic polymer as a matrix and embedded in the matrix a reinforcing amount of a rod-like aromatic heterocyclic polymer. The film generally contains about 5 to 50 weight percent, preferably 10 to 30 weight percent, of the rod-like polymer.

In another embodiment, the invention resides in a method for fabricating the composite film. Initially, the rod-like polymer and the coil-like polymer are dissolved in the indicated proportions in methanesulfonic acid. The amount of polymer so dissolved is such as to provide about a 1 to 30 percent, preferably 1 to 5 percent, solution of the polymer mixture in the solvent. The polymer solution is then introduced into a mold after which the solvent is removed. Removal of the solvent can be accomplished by any suitable means. In a preferred procedure, the mold is placed in a sublimator which is thermostated at about $-20°$ to $-25°$ C. The sublimator is evacuated continuously with a vacuum pump while being heated at about 50° to 60° C. to expedite removal of the methanesulfonic acid solvent. After leaving the solution, the solvent solidifies on the cold surface of the sublimator. The film so formed is then removed from the mold and dried under reduced pressure, e.g., 10 microns or less, at about 75° to 125° C. for about 12 to 36 hours.

In order to optimize the strength properties of the composite mixture, it is often preferred to subject the stiff chain, rod-like reinforcement in the soft, flexible polymer matrix to uniaxial orientation. This uniaxial orientation of the film is accomplished by initially allowing residual casting solvent, which acts as a plasticizer, to remain in the polymer mixture constituting the film. The film is then stretched or elongated to provide the desired orientation. Elongation of the film can be carried out by well known procedures. In one procedure, elongation for uniaxial orientation is conveniently conducted with an Instron tensile tester at crosshead speeds of about 0.01 to 0.5 inch per minute, preferably at slower rates of 0.01 to 0.02 inch per minute. During the orientation, the film is elongated or stretched by about 5 to 40 percent of its original length. The concentration of residual solvent (plasticizer) in the composite mixture ranges from about 1 to 30 weight percent, preferably about 15 weight percent.

After orientation of the stiff chain rods in the uniaxial direction of the composite mixture, residual solvent is leached from the film by means of a low boiling non-solvent. Examples of non-solvents for the polymers that can be used include aliphatic alcohols and ketones, such as methanol, ethanol, propanol, isopropanol, acetone, methylethylketone, and the like. Leaching of the solvent is carried out at a temperature ranging from room temperature to the reflux temperature of the non-solvent. Removal of the solvent by leaching is generally completed in about 5 to 30 minutes after which the film is recovered and dried to remove any non-solvent.

Even further enhancement of the physical properties of the composite film can be obtained if the leaching of the solvent is conducted while the film is under tension.

Thus, the non-solvent is advantageously applied to the surface of the film while under tension during the uniaxial orientation procedure.

In the foregoing discussion, the invention has been described primarily as it relates to composite films. However, the polymeric alloys of this invention are not limited to use in the fabrication of composites. For example, mixtures of the rod-like aromatic heterocyclic polymers and the coil-like heterocyclic polymers dissolved in methanesulfonic and can be used as a spinning dope. The as-spun fibers can be elongated by well known methods to produce high strength, high modulus, thermally stable fibers.

Rod-like aromatic heterocyclic polymers used in the practice of the present invention exhibit 'para' ordered geometry. Examples of such polymers, which are described in the literature, include those consisting essentially of repeating units having the following formulas.

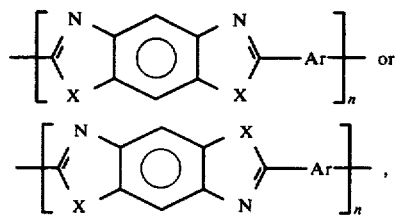

wherein X is NH, Nφ, O or S, where φ is phenyl, and wherein Ar

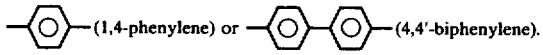

In the foregoing formulas, n is equal to the number of recurring units and has a value such that the polymers have an intrinsic viscosity of at least 2 dl/g, preferably 5 to 30, inclusive, as determined in methanesulfonic acid at 30° C. Examples of other rod-like polymers that can be used include those disclosed by one of use in commonly assigned copending application U.S. Ser. No. 811,345, filed on June 29, 1977, and issued on Aug. 22, 1978, as U.S. Pat. No. 4,108,835. The disclosure of this application is incorporated herein by reference.

Flexible coil-like heterocyclic polymer used in combination with the rod-like polymers are also described in the literature. Examples of such polymers include those consisting essentially of repeating units having the following formulas:

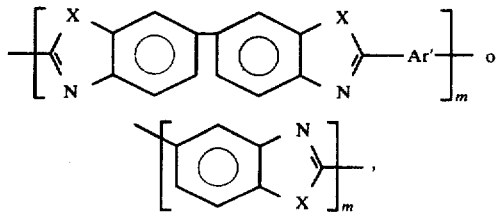

wherein X is NH, Nφ, O or S, where φ is phenyl, and Ar' is

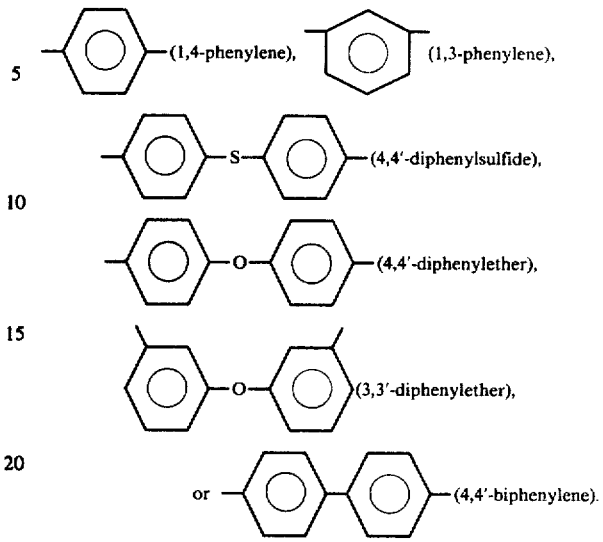

In the above formulas, m is an integer equal to the number of recurring units and has a value such that the polymers have an intrinsic viscosity of at least 1 dl/g, preferably 2 to 20, inclusive, as determined in methanesulfonic acid at 30° C.

A more complete understanding of the invention can be obtained by referring to the following illustrative examples which are not intended, however, to be unduly limitative of the invention.

EXAMPLE I

A series of runs was conducted in which composite films were prepared in accordance with the present invention. A control run was also carried out in which a film was fabricated which did not contain a rod-like polymer. The rod-like and coil-like polymers used in the runs had the following formulas:

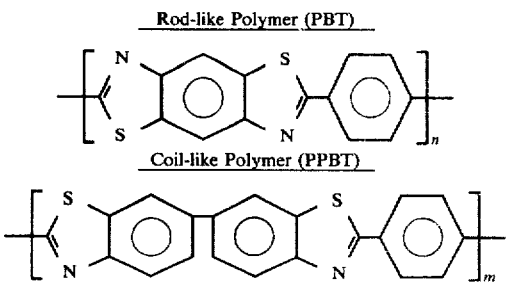

One percent solutions containing mixtures of the rod-like polymer (PBT) with an intrinsic viscosity of 5.07 and the coil-like polymer (PPBT) with an intrinsic viscosity of 2.38 were prepared in methanesulfonic acid. In each run 10 milliliters of the solution was pipetted into a flat bottom film casting dish. The dish was then placed in a sublimator thermostated at −24° C. The sublimator was evacuated with a vacuum pump and heated at 50° to 60° C. to hasten the removal of the methanesulfonic acid. After the films had formed, they were dried at 100° C. for 24 hours under reduced pressure (10 microns or less). The films were cut into 0.25 inch strips and broken in an Instron tensile tester. The amounts of polymers used and the results obtained in the tests are shown below in Table I.

TABLE I

| Rod(PBT) wt % | Coil (PPBT) wt % | Tensile, psi | Improvement, % | Modulus, 10⁵ psi | Improvement, % |
|---|---|---|---|---|---|
| — | 100 | 2,699 | — | 1.92 | — |
| 25 | 75 | 8,414 | 211 | 4.90 | 155 |
| 50 | 50 | 3,580 | 33 | 2.59 | 35 |
| 75 | 25 | 4,037 | 50 | 2.76 | 44 |

A series of runs were carried out in which composite films were prepared in accordance with the present invention and then subjected to uniaxial orientation. As in Example I, a control run was included. The rod-like and coil-like polymers used in the runs had the following formulas:

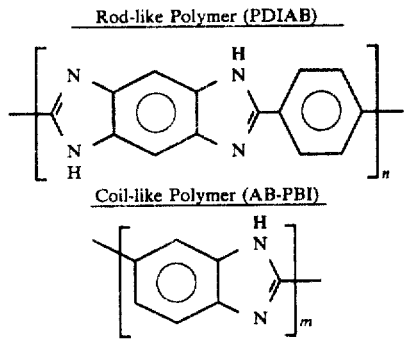

Rod-like Polymer (PDIAB)

Coil-like Polymer (AB-PBI)

One percent solutions containing mixtures of the rod polymer (PDIAB) with an intrinsic viscosity of 2.64 and the coil polymer (AB-PBI) with an intrinsic viscosity of 18.0 were prepared in methanesulfonic acid. In each run, 10 milliliters of the mixture was pipetted into a flat bottom casting dish after which the dish was placed in a sublimator thermostated at −24° C. The sublimator was evacuated continuously with a vacuum pump and heated at 50° to 60° C. to hasten the removal of the methanesulfonic acid. After the films had formed, they were dried at 100° C. under reduced pressure (10 microns) to provide films with an acid content (residual plasticizer) of about 15 weight percent. The films were cut into 0.25 inch strips and broken in an Instron tensile tester. The amounts of polymers contained in the films and the test results are shown below in Table II.

TABLE II

| Rod (PDIAB) wt % | Coil (AB-PBI) wt % | Tensile, psi | Improvement, % | Modulus, X10⁵ psi | Improvement, % |
|---|---|---|---|---|---|
| — | 100 | 14,600 | — | 2.00 | — |
| 10 | 90 | 17,954 | 23 | 8.20 | 310 |
| 20 | 80 | 12,392 | — | 5.17 | 158 |

EXAMPLE III

Film specimens prepared as described in Example II and having an acid content (residual plasticizer) of about 15 weight percent were subjected to uniaxial orientation. Thus, the specimens were elongated in an Instron tensile tester at a crosshead speed of 0.02 inch per minute. Thereafter, the oriented film specimens were broken in the tester. The amounts of polymers contained in the film composites and the test results are shown below in Table III.

TABLE III

| Rod (PDIAB) wt % | Coil (AB-PCI) wt % | Tensile, psi | Improvement % | Modulus, X10⁵ psi | Improvement, % |
|---|---|---|---|---|---|
| — | 100 | 20,730 | — | 3.17 | — |
| 10 | 90 | 40,092 | 93 | 13.4 | 323 |
| 20 | 80 | 23,509 | 13.4 | 6.24 | 97 |

EXAMPLE IV

Film specimens prepared as described in Example II and having an acid content (residual plasticizer) of about 15 weight percent were subjected to uniaxial orientation as described in Example III. While the film specimens were under tension in the Instron tester, methanol was applied to their outer surfaces in order to leach out the residual solvent in the films. Thereafter, the oriented film specimens were broken in the Instron tester. The amounts of polymers contained in the film composites and the test results are set forth below in Table IV.

TABLE IV

| Rod (PDIAB) wt % | Coil (AB-PBI) wt % | Tensile, psi | Improvement, % | Modulus, X10⁵ psi | Improvement, % |
|---|---|---|---|---|---|
| — | 100 | 20,730 | — | 3.17 | — |
| 10 | 90 | 53,500 | 154 | 14.1 | 345 |
| 20 | 80 | 40,000 | 93 | 10.3 | 225 |
| 30 | 70 | 35,000 | 69 | 12.8 | 304 |

As seen from the data in the foregoing examples, the present invention provides high strength reinforced composites based on the formation of polymer alloys. Thus, instead of adding reinforcing fibers to a plastic in the conventional manner, strength is obtained as a result of molecular orientation of polymer chains within the plastic matrix itself. The improvement in physical properties obtained by uniaxial orientation is demonstrated by the data shown in Table III although, as seen from the data in Table II, the non-oriented film composites containing residual acid plasticizer possess relatively good properties. However, when the residual plasticizer is leached from the oriented film composite while under tension, the properties of the film composites are further enhanced by an unexpected degree as seen from the data in Table IV.

From the foregoing description, it is seen that the present invention provides a simplified procedure for fabricating composites. Thus, the procedure eliminates many of the complexities currently encountered in using fibers to reinforce plastic matrices. Also, by their very nature, the present composites are not subject to the fiber-plastic interface problems as are conventional fiber-reinforced plastics.

As will be evident to those skilled in the art, modifications of the present invention can be made in view of the foregoing disclosure without departing from the spirit and scope of the invention.

We claim:

1. A polymeric alloy comprising a mixture of a flexible, coil-like heterocyclic polymer and a reinforcing amount of a rod-like aromatic heterocyclic polymer, the coil-like heterocyclic polymer consisting essentially of repeating units having the following structural formulas:

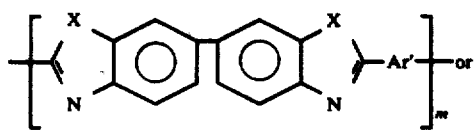

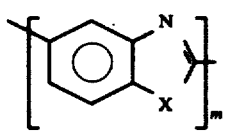

wherein X is NH, Nφ, O or S, where φ is phenyl, Ar' is

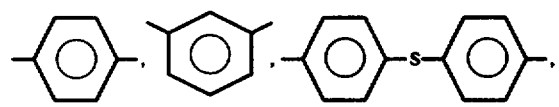

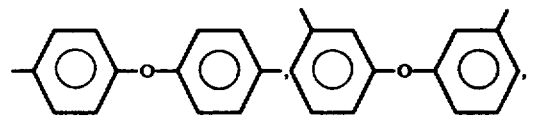

or 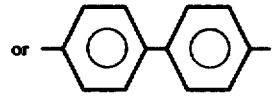

and m is an integer having a value such that the polymer has an intrinsic viscosity of about 2 to 20 dl/g as determined in methanesulfonic acid at 30° C., and the rod-like aromatic heterocyclic polymer consisting essentially of repeating units having the following formulas:

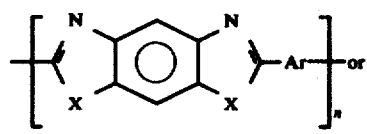

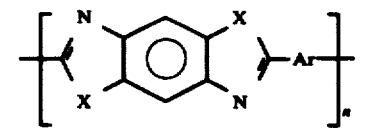

where X is NH, Nφ, O or S, where φ is phenyl, Ar is

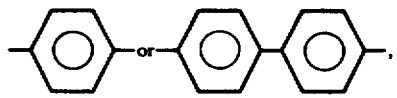

and n is an integer having a value such that the polymer has an intrinsic viscosity of about 5 to 30 dl/g as determined in methanesulfonic acid at 30° C.

2. The polymeric alloy according to claim 1 in which the coil-like heterocyclic polymer consists essentially of repeating units having the following structural formula:

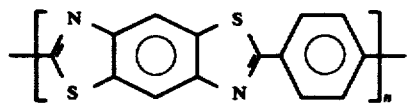

the rod-like aromatic heterocyclic polymer consists essentially of repeating units having the following structural formula:

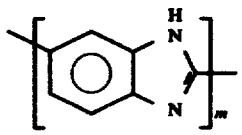

3. The polymeric alloy according to claim 1 in which the coil-like heterocyclic polymer consists essentially of repeating units having the following structural formula:

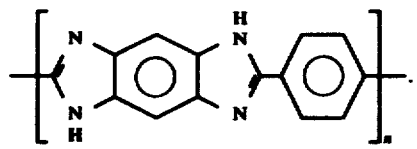

and the rod-like aromatic heterocyclic polymer consists essentially of repeating units having the following structural formula:

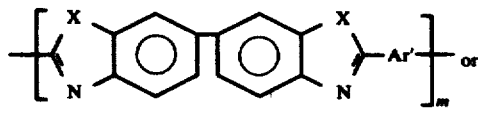

4. As an article of manufacture, a composite film comprising as a matrix a flexible, coil-like heterocyclic polymer, and embedded in the matrix a reinforcing amount of a rod-like aromatic heterocyclic polymer, the coil-like heterocyclic polymer consisting essentially of repeating units having the following structural formulas:

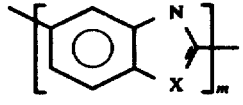

wherein X is NH, Nφ, O or S, where φ is phenyl, Ar' is

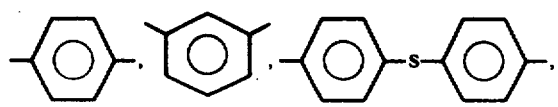

-continued

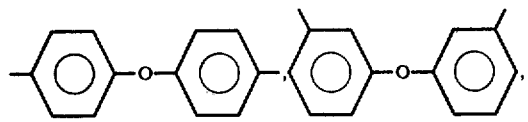

or 

and m is an integer having a value such that the polymer has an intrinsic viscosity of about 2 to 20 dl/g as determined in methanesulfonic acid at 30° C., and the rod-like aromatic heterocyclic polymer consisting essentially of repeating units having the following structural formulas:

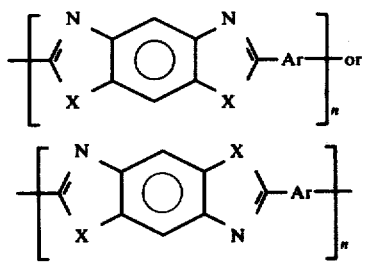

wherein X is NH, N$\phi$, O or S, where $\phi$ is phenyl, Ar is

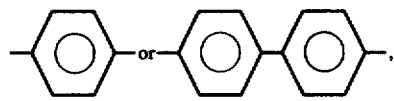

and n is an integer having a value such that the polymer has an intrinsic viscosity of about 5 to 30 dl/g as determined in methanesulfonic acid at 30° C.

5. The composite film according to claim 4 in which the coil-like heterocyclic polymer consists essentially of repeating units having the following structural formula:

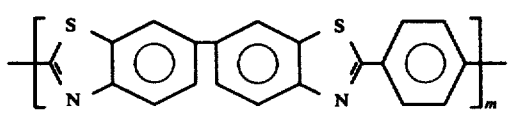

and the rod-like aromatic heterocyclic consists essentially of repeating units having the following structural formula:

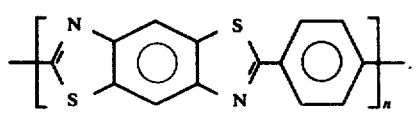

6. The composite film according to claim 4 in which the coil-like heterocyclic polymer consists essentially of repeating units having the following structural formula:

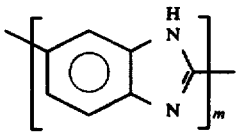

and the rod-like aromatic heterocyclic polymer consists essentially of repeating units having the following structural formula:

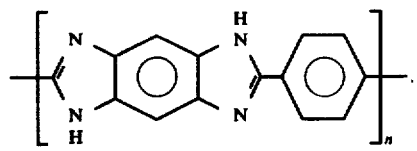

7. The composite film according to claim 4 in which polymer chains of the rod-like aromatic heterocyclic polymer are uniaxially oriented.

8. A method for preparing a composite film which comprises the steps of:
a. dissolving in methanesulfonic acid solvent a mixture of a flexible, coil-like amorphous heterocyclic polymer and a para ordered, rod-like aromatic heterocyclic polymer, the amount of polymers dissolved being sufficient to provide a 1 to 30 percent solution of the polymer mixture in the solvent and the polymer mixture containing about 5 to 50 weight percent of the rod-like polymer, the coil-like heterocyclic polymer consisting essentially of repeating units having the following structural formulas:

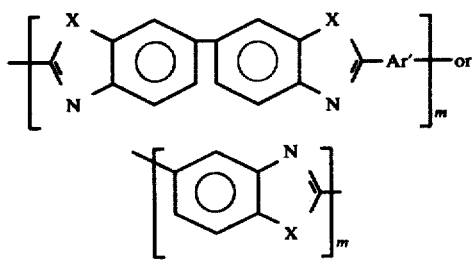

wherein X is NH, N$\phi$, O or S, where $\phi$ is phenyl, Ar' is

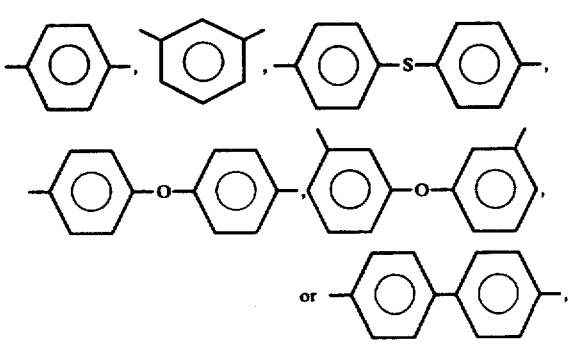

and m is an integer having a value such that the polymer has an intrinsic viscosity of about 2 to 20 dl/g as determined in methanesulfonic acid at 30° C., and the rodlike aromatic heterocyclic polymer consisting essentially of repeating units having the following structural formulas:

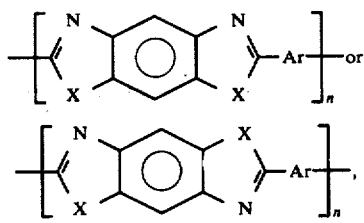

where X is NH, Nφ, O or S, where φ is phenyl, Ar is

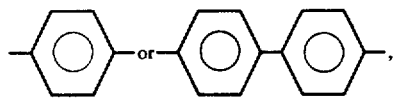

and n is an integer a value such that the polymer has an intrinsic viscosity of about 5 to 30 dl/g as determined in methanesulfonic acid at 30° C.
   b. introducing the polymer solution into a casting mold;
   c. removing solvent from the polymer solution, thereby forming a composite film in the mold;
   d. recovering the composite film from the mold; and
   e. drying the recovered composite film.

9. The method according to claim 8 in which the amount of solvent removed from the polymer solution in step c is such that residual solvents remains in the composite film, the concentration of the solvent being about 1 to 30 weight percent; the composite film containing residual solvent after being recovered from the mold is elongated, thereby subjecting polymer chains of the rod-like polymer to uniaxial orientation; and the residual solvent is leached from the uniaxially oriented composite film by contacting same with a non-solvent for the polymers.

10. The method according to claim 9 in which the residual solvent is leached from the composite film by applying the nonsolvent to the film while it is under tension during uniaxial orientation.

11. The method according to claim 10 in which the coil-like heterocyclic polymer consists essentially of repeating units having the following structural formula:

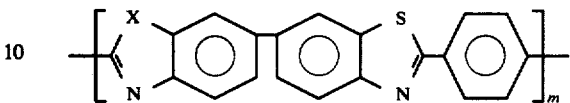

and the rod-like aromatic heterocyclic polymer consists essentially of repeating units having the following structural formula:

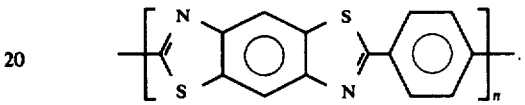

12. The method according to claim 10 in which the coil-like heterocyclic polymer consists essentially of repeating units having the following structural formula:

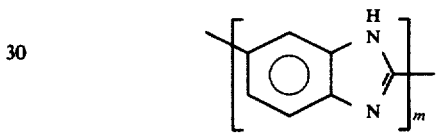

and the rod-like aromatic heterocyclic polymer consists essentially of repeating units having the following structural formula:

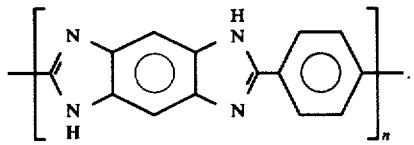

* * * * *